United States Patent [19]
Funakoshi et al.

[11] Patent Number: 5,988,515
[45] Date of Patent: Nov. 23, 1999

[54] AIR CONDITIONING SYSTEM AND METHOD FOR VEHICLES

[75] Inventors: Keiichi Funakoshi, Ohsato-gun; Ichiro Kuwabara, Kiryu, both of Japan

[73] Assignee: Sanden Corporation, Gunma, Japan

[21] Appl. No.: 09/058,862

[22] Filed: Apr. 13, 1998

[30] Foreign Application Priority Data

Apr. 11, 1997 [JP] Japan ..................................... 9-110343

[51] Int. Cl.[6] ................................. F24F 7/00; G01K 1/16
[52] U.S. Cl. ........................... 236/13; 236/91 C; 374/134
[58] Field of Search .......................... 236/49.3, 13, 91 C; 374/134; 165/257

[56] References Cited

U.S. PATENT DOCUMENTS 5,105,366  4/1992  Beckey ............................... 364/528.11
5,810,078  9/1998  Knutsson et al. ....................... 165/203

*Primary Examiner*—William Wayner
*Attorney, Agent, or Firm*—Baker & Botts, L.L.P.

[57] ABSTRACT

In a system and method for conditioning air in a vehicle, it is determined whether an inside air temperature detected by an inside air temperature sensor is stable, an outside air temperature is estimated based on the inside air temperature only when the inside air temperature is stable, a target conditioned air temperature is calculated using an estimated outside air temperature as well as the estimation of outside air temperature is repeated, and the estimated outside air temperature used for the calculation of the target conditioned air temperature is renewed only when the estimated outside air temperature is different from a prior estimated outside air temperature by a value more than a predetermined value. The outside air temperature is adequately estimated without providing an outside air temperature sensor. Consequently, a desirable air conditioning for vehicles may be performed simply and inexpensively.

8 Claims, 1 Drawing Sheet

AIR CONDITIONING SYSTEM AND METHOD FOR VEHICLES

BACKGROUND OF THE INVENTION

1. Field of the Invention

The present invention relates to an air conditioning system and method for vehicles, and, more specifically, to an air conditioning system and method suitable as an air conditioner and control method for use in a work vehicle.

2. Description of the Related Art

A known system and method for an air conditioner used in a work vehicle includes an inside air temperature sensor, an outside air temperature sensor, and a method for maintaining air that is inside the vehicle, condirioned air that is discharged from the air conditioner, at an optimum temperature using signals from both sensors representing their respective detected temperatures.

However, the outside air temperature sensor must be installed so as to be exposed to the outside of the vehicle, and the signal from the outside sensor must be sent to a control device located within the vehicle. Therefore, the cost of the entire air conditioner increases due to the installation of the outside air temperature sensor.

On the other hand, a system that does not have an outside air temperature sensor is also known. In a known system that does not use an outside air temperature sensor, for example, proportional and integral control ("PI control") may be used. In PI control, however, because feed forward control cannot be performed, optimum air conditioning that considers the thermal load due to air outside the vehicle may be difficult.

SUMMARY OF THE INVENTION

Accordingly, it is an object of the present invention to provide an air conditioning system and method for vehicles that estimates an outside air temperature without using an outside air temperature sensor, and performs optimum air conditioning while considering the thermal load due to air outside the vehicle using an estimated outside air temperature.

To achieve the foregoing and other objects, an air conditioning system and method for vehicles according to the present invention are provided. The method for conditioning air in a vehicle according to the present invention comprises the steps of: determining whether an inside air temperature detected by an inside air temperature sensor is stable; estimating an outside air temperature based on the inside air temperature only when the inside air temperature is stable; calculating a target conditioned air temperature using an estimated outside air temperature, as well as repeating the estimation of outside air temperature and renewing the estimated outside air temperature used for the calculation of the target conditioned air temperature only when the estimated outside air temperature is different from a prior estimated outside air temperature by a value more than a predetermined value.

The air conditioning system for vehicles according to the present invention comprises an inside air temperature sensor for detecting an inside air temperature, and means for controlling a conditioned air temperature. The control means determines whether the inside air temperature detected by the inside air temperature sensor is stable, estimates an outside air temperature based on the inside air temperature only when the inside air temperature is stable, calculates a target conditioned air temperature using an estimated outside air temperature as well as repeating the estimation of outside air temperature, and renews the estimated outside air temperature used for the calculation of the target conditioned air temperature only when the estimated outside air temperature is different from a prior estimated outside air temperature by a value more than a predetermined value.

In the method and system, the outside air temperature may be estimated based on the target conditioned air temperature and a preset temperature in addition to the inside air temperature. Further, upper and lower limits may be set for the estimated outside air temperature.

In the method and system, because an outside air temperature used for the control is estimated, it is not necessary to provide an outside air temperature sensor, thereby simplitying and reducing the cost of the system. Feed forward control is possible using the estimated outside air temperature for the calculation of a target conditioned air temperature. An optimum inside air temperature control that considers the outside air temperature may be possible by this control using the estimated outside air temperature.

Further, because the outside air temperature is estimated based on the feed back information (detected inside air temperature) from the inside air temperature sensor, the estimated value may be determined as a load including the thermal load. As a result, even in a situation where the conditioned air temperature from the air conditioner varies with an outside air temperature due to an external condition (for example, a situation where the water temperature of a radiator varies), the control may automatically follow, thereby performing an optimum air temperature control regardless of external changes.

Moreover, the estimation of outside air temperature is performed only when detected and determined inside air temperature is stable, so that stable control may be achieved without "hunting". Further, because the the estimated outside air temperature used for the calculation of target conditioned air temperature is renewed only when the estimated outside air temperature is different from a prior estimated outside air temperature by a value more than a predetermined value, only variation of the outside air temperature necessary for an actual air conditioning may be estimated, and the estimated value may be efficiently used for the control. Therefore, the control may be further stabilized.

Further, by using such an estimated outside air temperature for the control, a perception control may be achieved. For example, the inside air temperature may be controlled to be relatively low in the summer season and relatively high in the winter season.

Furthermore, when upper and lower limits are set for the estimated outside air temperature, the estimated value is not considered if it exists outside of a practical range, runaway control may be prevented, thereby further stablizing control.

Further objects, features, and advantages of the present invention will be understood from the following detailed description of the preferred embodiment of the present invention with reference to the accompanying figure.

BRIEF DESCRIPTION OF THE DRAWING

A preferred embodiment of the invention is now described with reference to the accompanying figure, which is given by way of example only, and is not intended to limit the present invention.

DETAILED DESCRIPTION OF THE PREFERRED EMBODIMENTS

Figure 1:
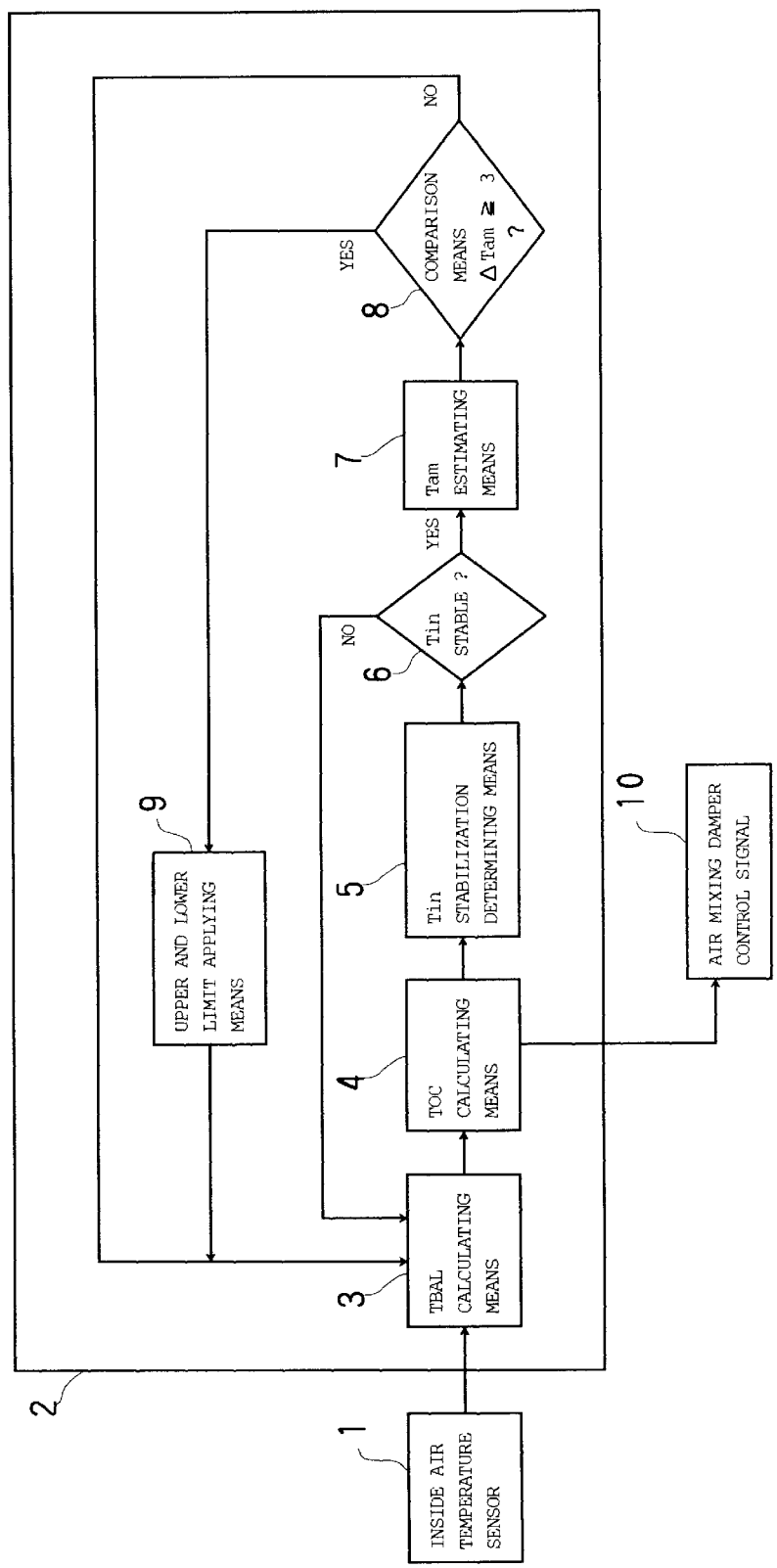
FIG. 1 is a block diagram of an air conditioning system according to an embodiment of the present invention.

FIG. 1 is a block diagram showing an embodiment of an air conditioning system and method for vehicles according to the present invention. Inside air temperature sensor 1 is provided within the interior of a vehicle, and detects an inside air temperature. Inside air temperature sensor 1 generates inside air temperature signal Tin and sends this signal Tin to control device 2. Control device 2 performs an estimation of the outside air temperature and calculates target conditioned air temperature TOC.

In control device 2, balance temperature TBAL, used for the calculation of target conditioned air temperature TOC, is calculated. TBAL calculating means 3 calculates balance temperature TBAL in accordance with equation (1), below. TOC calculating means 4 calculates target conditioned air temperature TOC in accordance with equation (2), below.

$$\text{TBAL} = e \times \text{Tset} - f \times \text{Tam} + g \quad (1)$$

$$\text{TOC} = \text{TBAL} + d \times (\text{Tset} - \text{Tin}) - \text{TLC} \quad (2)$$

Where Tset is a preset temperature, Tam is an outside air temperature estimated which will be described later, TLC is a correction amount of sunshine, and d, e, f and g are predetermined coefficients. These coefficients d, e, f and g are predetermined based on an actual examination, depending upon the kinds of air conditioner, vehicle, etc. For example, d is set in the range of 2.0–8.0, e is set in the range of 0.8–3.2, f is set in the range of 0.6–2.3, and g is set in the range of 3.5–14.

Next, inside air temperature determining means 5 and 6 determine whether inside air temperature Tin, detected by inside air temperature sensor 1, is stable. This determination is performed, for example, using a difference between the present inside air temperature Tin1 and a prior inside air temperature Tin2, or by using the sum of the differences, and when the difference, or the sum of the differences, is less than predetermined value ΔTin, it is considered to be stable. Therefore, for example, stability may be determined according to the following equation.

$$\Sigma(\text{Tin1} - \text{Tin2}) \leq \Delta\text{Tin}$$

The detection interval of inside air temperature sensor 1 may be set to be, for example, about 1 second. In the case where the sum of the differences is used, a sum of about 2 minutes may be sufficient for the calculation.

Outside air temperature Tam is estimated only when inside air temperature Tin is stable. When inside air temperature Tin is not stable, the control flow returns to the calculation step of TBAL calculating means 3.

Tam estimating means 7 estimates outside air temperature Tam, for example, according to equation (3).

$$\text{Tam} = (-\text{TOC} - \text{TLC} + a \times \text{Tset} + b)/c \quad (3)$$

Where, a, b and c are predetermined coefficients. These coefficients a, b and c are predetermined based on an actual examination, depending upon the kinds of air conditioner, vehicle, etc. For example, a is set in the range of 0.8–3.2, b is set in the range of 3.5–14, and c is set in the range of 0.6–2.3.

In operation, Tin is used for the initial value of outside air temperature Tam. Balance temperature TBAL may be calculated by the equation (1), above by TBAL calculating means 3. Target conditioned air temperature TOC is calculated by equation (2), above using TBAL, calculated by TOC calculating means 4. Using calculated target conditioned air temperature TOC, outside air temperature Tam is calculated and estimated by Tam estimating means 7, in accordance with equation (3), above.

Using the estimated outside air temperature Tam, balance temperature TBAL is calculated again by equation (1), and target conditioned air temperature TOC is calculated by equation (2) using calculated TBAL. This series of calculation may be repeated. As a result, calculated values of Tam, other than the initial value input as Tin, become estimated values. The estimated value is renewed after every calculation, and target conditioned air temperature TOC is calculated as an optimum control temperature based on inside air temperature Tin, estimated outside air temperature Tam, and preset temperature Tset.

Further, in order to stabilize the control, when estimated outside air temperature Tam is renewed, comparison means 8 compares Tam, calculated by Tam estimating means 7 (that is, estimated outside air temperature to be used for the next control), and Tam used for the calculation of TBAL (that is, outside air temperature used for the present control). Only when the difference between the values is more than a predetermined value (for example, greater than 3° C.), the prior Tam is replaced with the present Tam. When the difference is less than the predetermined value, the replacement is not performed.

Moreover, in one embodiment, a limitation may be applied to the replacement by providing upper and lower limit applying means 9. In particular, upper and lower limits are set within a practical range for outside air temperature Tam. By including this limitation, runaway of the control may be prevented by not allowing a rapid variation or an abnormal estimated to be considered. For example, the upper limit may be set at about 40° C., and the lower limit may be set at about –20° C. With such a limitation, runaway of the control, for example, in a condition where a door is opened or in a condition where the control or the inside air temperature is not stabilized, may be prevented.

Although not shown in FIG. 1, the next renewal may not be performed within a predetermined constant time (for example, 5 minutes) after the renewal of outside air temperature Tam. By diong so, the estimated outside air temperature Tam may be used for the control at an adequate timing, thereby further stabilizing the control.

The signal of the target conditioned air temperature TOC, calculated by TOC calculating means 4 based on the estimated outside air temperature Tam, for example, is sent out as air mixing damper control signal 10. By appropriately controlling an air mixing damper (not shown) based on air mixing damper control signal 10, the actual conditioned air temperature may be controlled to be the target conditioned air temperature TOC.

Thus, in the present invention, feed forward control considering an outside air temperature is possible without using an outside air temperature sensor, and an optimum control of the conditioned air temperature may be performed.

The control using the estimated outside air temperature is particularly suitable as air conditioning system and method for an auto air conditioner used in a work vehicle. The control system may be simplified by constituting a system without an outside air temperature sensor, and adequate control considering actual requirements becomes possible by the feed forward control. Moreover, because the estimation of outside air temperature is performed only when the inside air temperature is stable, the control may become practical and stable. Moreover, in the present invention, by the estimation of outside air temperature, a perception control may be achieved. For example, the inside air temperature may be controlled to be lower in the summer season as compared with those for other seasons, and higher in the winter season as compared with those for other seasons.

Although only one embodiment of the present invention has been described in detail herein, the scope of the invention is not limited thereto. It will be appreciated by those skilled in the art that various modifications may be made without departing from the scope of the invention. Accordingly, the embodiment disclosed herein is only exemplary. It is to be understood that the scope of the invention is not to be limited thereby, but is to be determined by the claims which follow.

What is claimed is:

1. A method for conditioning air in a vehicle comprising the steps of:
   determining whether an inside air temperature detected by an inside air temperature sensor is stable;
   estimating an outside air temperature based on said inside air temperature only when said inside air temperature is stable;
   calculating a target conditioned air temperature using an estimated outside air temperature as well as repeating said estimation of outside air temperature; and
   renewing said estimated outside air temperature used for said calculation of the target conditioned air temperature only when said estimated outside air temperature is different from a prior estimated outside air temperature by a value more than a predetermined value.

2. The method according to claim 1, wherein said outside air temperature is estimated based on said target conditioned air temperature and a preset temperature in addition to said inside air temperature.

3. The method according to claim 1, wherein an upper and a lower limit is set for said estimated outside air temperature.

4. The method according to claim 2, wherein an upper and a lower limit is set for said estimated outside air temperature.

5. An air conditioning system for vehicles comprising:
   an inside air temperature sensor for detecting an inside air temperature; and
   means for controlling a conditioned air temperature, said control means determining whether said inside air temperature detected by said inside air temperature sensor is stable, estimating an outside air temperature based on said inside air temperature only when said inside air temperature is stable, calculating a target conditioned air temperature using an estimated outside air temperature as well as repeating said estimation of outside air temperature and renewing said estimated outside air temperature used for said calculation of said target conditioned air temperature only when said estimated outside air temperature is different from a prior estimated outside air temperature by a value more than a predetermined value.

6. The air conditioning system according to claim 5, wherein said control means estimates said outside air temperature based on said target conditioned air temperature and a preset temperature in addition to said inside air temperature.

7. The air conditioning system according to claim 5, wherein an upper and a lower limit is set for said estimated outside air temperature in said control means.

8. The air conditioning system according to claim 6, wherein an upper and a lower limit is set for said estimated outside air temperature in said control means.

* * * * *